United States Patent
Kormann

(10) Patent No.: US 12,041,887 B2
(45) Date of Patent: Jul. 23, 2024

(54) STORAGE OF HARVESTED MATERIAL IN A SILO

(71) Applicant: DEERE & COMPANY, Moline, IL (US)

(72) Inventor: Georg A. Kormann, Zweibruecken (DE)

(73) Assignee: DEERE & COMPANY, Moline, IL (US)

( * ) Notice: Subject to any disclaimer, the term of this patent is extended or adjusted under 35 U.S.C. 154(b) by 242 days.

(21) Appl. No.: 17/807,962

(22) Filed: Jun. 21, 2022

(65) Prior Publication Data

US 2023/0041687 A1 Feb. 9, 2023

(30) Foreign Application Priority Data

Aug. 4, 2021 (DE) ................ 102021120329.5

(51) Int. Cl.
*A01F 25/18* (2006.01)
*A01D 90/10* (2006.01)

(52) U.S. Cl.
CPC ............ *A01F 25/183* (2013.01); *A01D 90/10* (2013.01)

(58) Field of Classification Search
CPC ...... A01F 25/183; A01F 25/18; A01F 25/186; A01F 25/163; A01F 25/166; A01D 90/10; A01D 90/105
See application file for complete search history.

(56) References Cited

U.S. PATENT DOCUMENTS

2020/0285241 A1* 9/2020 Smith .................. A01F 25/186

FOREIGN PATENT DOCUMENTS

| DE | 7806420 U1 | 6/1978 |
|---|---|---|
| DE | 102016110138 A1 | 12/2017 |
| DE | 102020206120 A1 | 10/2021 |
| EP | 2591659 A1 | 5/2013 |
| EP | 3195719 A1 | 7/2017 |
| EP | 3403487 A1 | 11/2018 |
| EP | 3403488 A1 | 11/2018 |

OTHER PUBLICATIONS

R Latsch et al., Grass silage compaction in the flat silo, Agroscope Transfer No. 28, Jun. 2014, pp. 1-8, [online], [retrieved on Jun. 8, 2021]. Retrieved from the Internet <URL://docplayer.org/docview/51/27776811/>.
Brochure "Gigant deportation vehicle" from Fliegl, [online], [retrieved on Jul. 2, 2021]. Retrieved from the Internet < http://www.agro-mix6.hu/flieglinfo/flaswletolo.pdf>.

* cited by examiner

*Primary Examiner* — Jacob M Amick

(57) ABSTRACT

A method of storing harvested crop material in a silo includes loading the harvested crop material into a container of a transport vehicle in a field. The container includes a discharge system that is operable to unload the crop material, and which is controlled via an electronic control device. The crop material is transported from the field to the silo with the transport vehicle. The crop material is unloaded from the container of the transport vehicle directly into the silo with the discharge system. The electronic control device automatically controls at least one of the transport vehicle and the discharge system while unloading the crop material to form a harvested material layer in the silo having a predetermined layer thickness.

8 Claims, 3 Drawing Sheets

STORAGE OF HARVESTED MATERIAL IN A SILO

CROSS-REFERENCE TO RELATED APPLICATIONS

This application claims the benefit of German Patent Application No. 102021120329.5, filed on Aug. 4, 2021, the disclosure of which is hereby incorporated by reference.

TECHNICAL FIELD

The disclosure generally relates to a transport vehicle and a method for storing harvested material in a silo.

BACKGROUND

Silage is a type of fodder which is produced from green foliage plants which are stored in a silo and stabilized by acidification. The acidification takes place by means of fermentation. The finished silage may be fed to cows, sheep and other ruminants. The storage and fermentation process is denoted as ensilaging and is carried out by using whole grass plants (not only the seed heads), such as maize, sorghum or other cereals.

In some countries (for example North America, Australia, Northwestern Europe and New Zealand) it is usual to deposit the silage in large heaps on the ground and to drive over the silage with a tractor in order to force out the air, and then to cover it with plastic sheeting which is fixed by means of used tires or tire ring walls. In other countries (for example Northern Europe) so-called bunker silos, which comprise a floor and side walls made of concrete or other materials (for example railway sleepers), are used for unloading the silage. Also in this case, the compacting and sealing are carried out by means of sheeting which is fixed by tires.

In the past, the fermentation was generally carried out by indigenous micro-organisms, whilst nowadays, however, the silage is generally supplied with ensilage agents in which specific micro-organisms are contained in order to accelerate the fermentation or to improve the silage. Ensilage agents may contain one or more strains of lactic acid bacteria, generally *Lactobacillus plantarum*. Other bacteria used include the species *Lactobacillus buchneri, Enterococcus faecium* and *Pediococcus*.

The silage stored and covered in the silo is accordingly subjected to an anaerobic fermentation, which starts approximately 48 hours after filling the silo and converts sugars contained in the plants into acid. The fermentation is substantially terminated after approximately 2 weeks. Before the anaerobic fermentation starts, there is an aerobic phase in which the oxygen contained in the silage is consumed. The packing density of the fodder determines the quality of the silage obtained.

If the fodder is well compacted, the supply of oxygen is limited and the resulting acid-based fermentation causes a decomposition of the carbohydrates present into acetic acid, butyric acid and lactic acid. Such a silage product is denoted as sour silage. If, however, on the other hand the fodder is not well compacted or loosely deposited or the silo is only filled up gradually, the oxidation takes place more rapidly and the temperature rises. In these cases, the oxygen of the air penetrating therein may lead to the production of ammonia or butyric acid and in the worst case the silage may become toxic and may no longer be used as animal fodder. If the fermentation process is not carefully carried out and controlled, therefore, the sour silage takes on an unpleasant odor due to the excessive production of ammonia or butyric acid (the latter is responsible for the odor of rancid butter).

For the production of high quality silage it is accordingly important to compact the fodder sufficiently well in order to avoid the negative effect of oxygen pockets. Additionally, when opening the silage heap the inflow of oxygen is determined by the packing density. The denser the silo, the more slowly oxygen flows therein after opening. The less oxygen available, the more slowly the bacteria and mold contained in the silo break down the protein contained therein. Accordingly, the loss of energy between opening the heap and using the silage as animal fodder is directly dependent on the packing density. The silage is thus compacted further after delivery in order to force out as far as possible the oxygen between the plant parts. Sufficient compaction, however, may only be achieved when the layer to be compacted is not thicker than a maximum value of, for example, 30 cm (R. Latsch et al., Grass Silage Compaction in Horizontal Silos, Agroscope Transfer No. 28, June 2014, pages 1 to 8, downloaded on 8.6.2021 from https://docplayer.org/docview/51/27776811/).

When filling the silo, the harvested material delivered from the field is directly deposited in a heap on the silo or in the vicinity thereof and distributed on the silo by means of a distribution vehicle in order to achieve the desired thickness of the layer, and subsequently compacted by a compacting vehicle (EP 3 195 719 A1, EP 3 403 487 A1, EP 3 403 488 A1, US 2020/0285241 A1). A further method provides that the harvested material is distributed on the silo directly from the loading or transport vehicle and that the layer thickness achieved is measured, and on the basis thereof the compaction (EP 2 591 659 A1) is controlled. In the prior art, so-called push-off trailers with distribution rollers are used for unloading the harvested material on the silo, said push-off trailers being designed to achieve a uniform distribution of the silage in the horizontal silo (Brochure for "Gigant" push-off trailer manufactured by Fliegl, downloaded on Feb. 7, 2021 from http://www.agromix6.hu/flieglinfo/flaswletolo.pdf), or loading vehicles which are provided at the discharge end with metering rollers for the removal of the harvested material (DE 78 06 420 U1) are used.

The distribution of the harvested material on the silo by means of a distribution vehicle involves a further working step in the ensilaging, which is time-consuming and energy-consuming. Whilst hitherto the harvested material transport vehicles have been able to discharge the harvested material in a metered manner on the silo, in the absence of information regarding the thickness obtained, it has been difficult for the user to achieve the correct layer thickness of the harvested material over the entire surface of the silo.

SUMMARY

A method for the storage of harvested material in a silo is provided. A transport vehicle, which is loaded with the harvested material and which is controlled by an electronic control device, unloads the harvested material at a predetermined layer thickness of a harvested material layer on the silo.

In other words, instead of or in addition to the previous automated distribution of the harvested material on the silo by a separate distribution machine, it is proposed to control the transport vehicle by means of an electronic control device such that it deposits the harvested material in a predetermined layer thickness on the silo. In this manner, the intermediate step of the distribution of the harvested material on the silo is dispensed with or is at least shortened.

The control device may be supplied with information regarding the predetermined layer thickness and/or information regarding properties of the harvested material, the control device calculating the layer thickness using this information.

The control device may control the speed and/or the path of the transport vehicle over the silo and/or at least one parameter of a discharge system of a transport container of the transport vehicle containing the harvested material, in terms of reaching the predetermined layer thickness.

To this end, the control device may cooperate via a user interface with a user of the transport vehicle, who undertakes the corresponding adjustments by hand, or may automatically activate the steering and speed presetting means of the transport vehicle and/or actuators for controlling the discharge system.

The predetermined layer thickness may be uniform or vary in the horizontal direction and/or vertical direction of the silo.

A single harvested material layer may be generated by a plurality of transport vehicles communicating with one another.

The harvested material layer may be compacted by a compacting vehicle and a further harvested material layer may be subsequently applied onto the silo, said further harvested material layer also being compacted until the silo is sufficiently filled.

The electronic control device for controlling the transport vehicle, which is loaded with harvested material, may be configured to control the transport vehicle such that it unloads the harvested material in the harvested material layer at a predetermined layer thickness on the silo.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
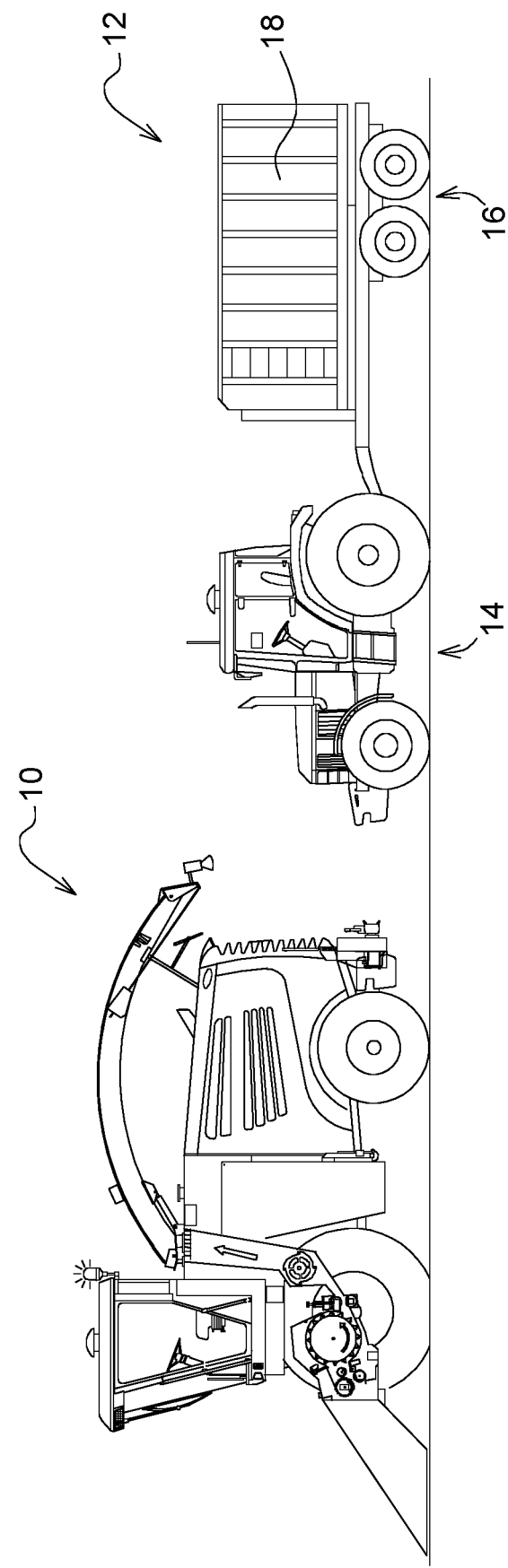
FIG. 1 shows a schematic view of a harvesting chain for harvesting the harvested material to be ensilaged.

Referring to the Figures, wherein like numerals indicate like parts throughout the several views, FIG. 1 shows a harvesting chain for harvesting green plants. The harvesting chain includes a harvesting vehicle in the form of a forage harvester 10 and a transport vehicle 12 in the form of a tractor 14 with a trailer 16. In harvesting mode the forage harvester 10 harvests plants from a field, chops the plants and loads the chopped plants onto a transport container 18 of the trailer 16. The trailer 16 could also be self-propelled, i.e. it could be configured as a motorized vehicle with a transport container 18.

A further embodiment, not shown in the drawings, of a harvesting chain which is suitable, in particular, for harvesting grass may comprise a tractor 14 and a loading vehicle towed thereby, i.e. the trailer 16 is provided in this case with a pick-up in order to transfer harvested material, which is mown, dried and finally brought together to form a swath, into its transport container 18. The forage harvester 10 is not required in this case.

Figure 2:
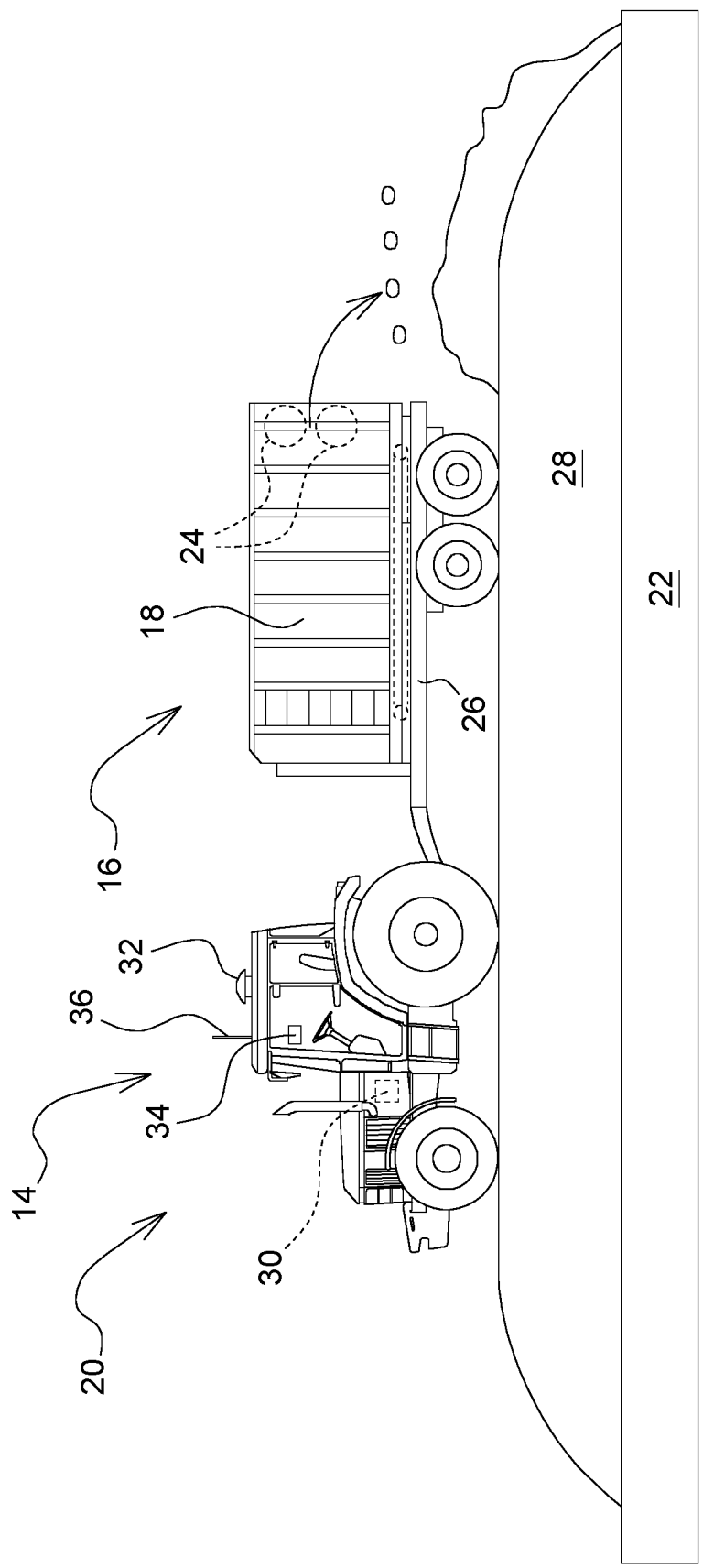
FIG. 2 shows a side view of a silo with a transport vehicle working therein during the discharge of harvested material.

The harvested material (the silage) is moved by the tractor 14 to a silo 20, as is shown schematically in FIG. 2. The silo 20 is in the form of a so-called bunker silo and comprises a base 22 and lateral walls, not shown, which are generally all produced from concrete. The silo 20 is designed as a horizontal silo, into which the chopped green plants are introduced by the trailer 16 and distributed therein, and is thus open to the left and to the right. The harvested material is discharged by a discharge system 24 and/or 26 from the transport container 18 of the trailer 16 directly onto the silo 10 and distributed by the trailer 26 on the silo 20. In the embodiment shown, the discharge system 24 is designed as metering rollers and the discharge system 26 is designed as a scraper floor conveyor which conveys the harvested material to the rear and supplies it to the metering rollers 24. In a further embodiment, the discharge system could be designed as a push-off wall which is displaceable in the longitudinal direction of the transport container 18 (see DE 10 2016 110 138 A1).

The harvested material is compacted by a compacting vehicle, not shown, after one or more transport vehicles 12 have deposited a harvested material layer 28 in the silo 20. Subsequently, further harvested material is delivered and distributed and compacted again until the harvested material layer 28 has reached a desired overall height, and is finally covered. To this end, reference is made to the prior art discussed in the Background.

The present disclosure relates to the problem of distributing each newly delivered harvested material layer 28 at a desired layer thickness on the silo. Previous solutions provide that the user of the tractor 14 drives over the silo 20 at a speed which appears expedient to the user, in the hope that the layer thickness achieved is neither too big nor too small. However, this generally leads to the majority of the harvested material being deposited in the middle of the silo 20, so that a separate working step is required for distributing the harvested material.

Figure 3:
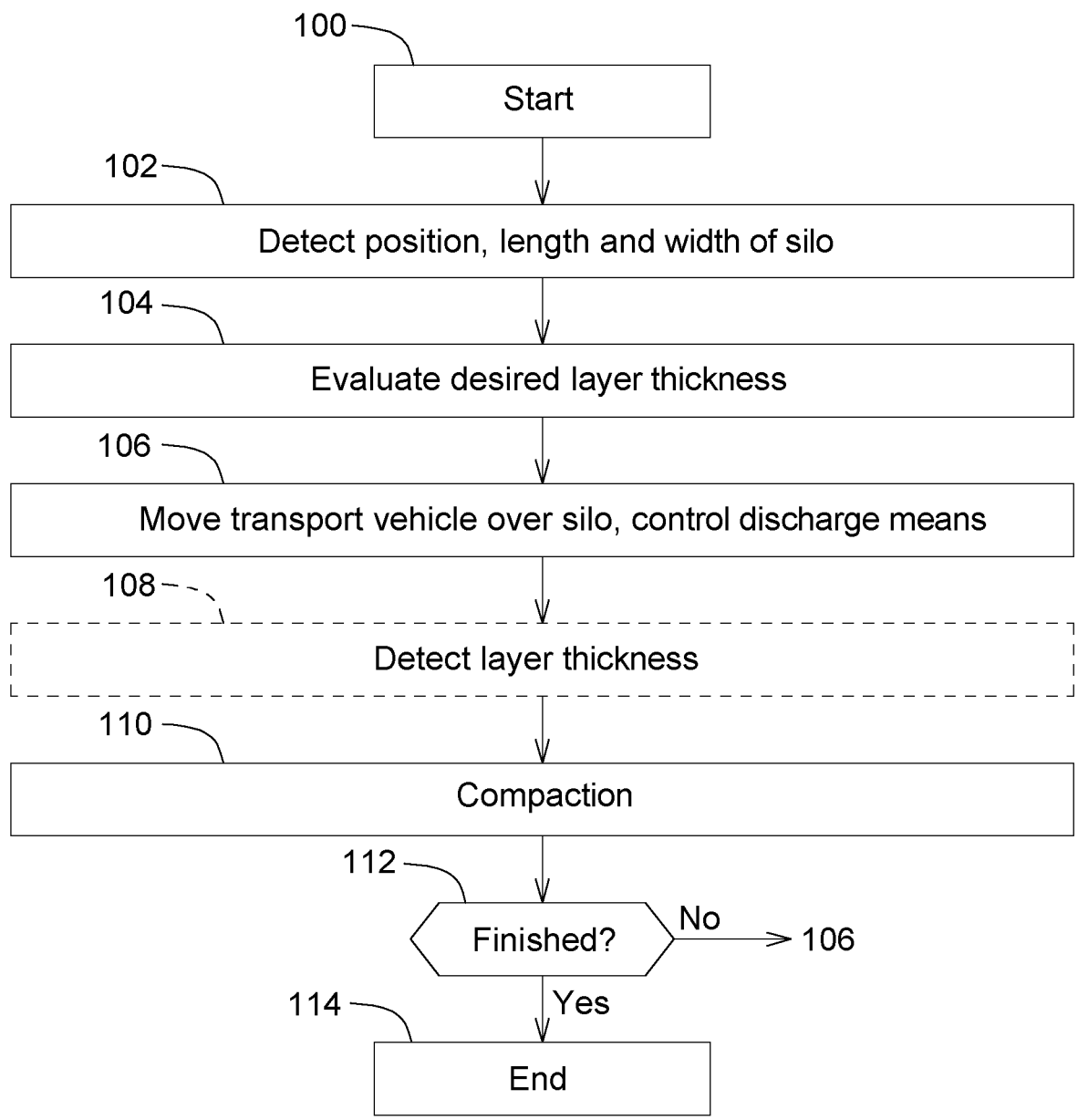
FIG. 3 shows a flow diagram, according to which a control device of the transport vehicle operates.

FIG. 3 shows a flow diagram of a method according to the present disclosure for avoiding this problem. After the start in step 100, the geographical position and the dimensions of the silo 20 in the longitudinal and transverse direction are determined and stored in step 102 by means of an electronic control device 30. The position of the silo 20 may be determined using stored maps (for example from the internet by using map services) or the position is determined by driving toward the corners of the silo 20 with the tractor 14, using a receiver 32 attached thereto and connected to the control device 30 for receiving signals from a satellite-based position determining system (GNSS, such as GPS, Galileo and/or Glonass). The dimensions of the silo 20 may be determined in a similar manner. The aforementioned data may also be directly input into the control device 30 by means of a user interface 34.

After step 102, the control device 30, the position and the dimensions of the silo 20 are thus known. In the following step 104 the desired thickness (vertical dimension) of the harvested material layer 28 is determined. To this end, a user may input values into the user interface 34 of the tractor 14 or the desired thickness is established by the control device 30 using measured values detected by sensor, for example regarding the moisture of the harvested material and/or the compactability thereof. It should be mentioned that the desired layer thickness for the entire silo 20 may be uniform or vary locally, for example it could be greater in the middle than at the edge. A variation in the layer thickness in the vertical direction is also conceivable; thus the lower harvested material layers 28 could be thicker or thinner than the harvested material layers 28 located thereabove. One possible method for calculating a desired layer thickness is described in DE 10 2020 206 120 A1.

In the following step 106, by the provision of control signals by the control device 30, the transport vehicle 12 is moved over the silo 20 and/or the discharge systems 24, 26 are controlled in such a manner that the desired layer thickness of the harvested material layer 28 is achieved. Said control signals of the control device 30 may be provided as instructions to the user of the tractor 14 via the user interface 34, so that the user of the tractor 14 may steer at a speed predetermined by the control device 30 along a path predetermined by the control device 30 (by using a speed presetting device in the form of an accelerator pedal or hand lever and a steering wheel) or the steering and speed of the tractor 14 is provided by the control device 30 without the assistance of the user by using automatic steering and speed presetting means of the tractor 14. Additionally or alternatively, the discharge systems 24 and/or 26 are controlled by the control device 30, such that the desired layer thickness of the harvested material layer 28 is produced. A display of one or more working parameters (for example speed or rotational speed) of the discharge systems 24 and/or 26 may also be implemented here via the user interface 34, or the control device 30 automatically controls the working parameters of the discharge systems 24, 26 via suitable actuators. In the case of a push-off trailer, the control device 30 would control the actuator for displacing the push-off wall along the push-off trailer and optionally guide plates for deflecting the harvested material to the side. (Stored) correlations between the layer thickness and the associated parameters of the tractor 14 and the discharge systems 24, 26 are present in the control device 30 or an activation is carried out by a closed loop control system, by the achieved layer thickness being determined by a sensor (see below).

Step 106 is carried out until the transport container 18 is emptied, unless the silo 20 is sufficiently filled and a part of the load is intended to be unloaded on another silo.

In the optional step 108, the achieved layer thickness of the harvested material layer 28 is detected and a corresponding signal supplied to the control device 30. This detection may be carried out by an optical sensor, for example a camera, which is attached to the silo 20 or to the tractor 14, or the vertical position is detected of a vehicle, for example the compacting vehicle, which travels over the silo 20 before and after the harvested material layer 28 is introduced into the silo 20, the signal of a position determining system (similar to that of the tractor 14) being able to be used therefor. The detection of the layer thickness may serve, when step 106 is performed again, to modify the values used therein (speed of the tractor 14, path thereof and/or the working parameters of the discharge systems 24, 26) or the correlations forming the basis thereof, in order to achieve the desired layer thickness as accurately as possible.

Step 110 follows, wherein the harvested material layer 28 is compacted by a separate compacting vehicle (not shown) in the conventional manner, for which reference might be made to the prior art mentioned in the Background. Step 110 may be carried out by the control device 30 of the tractor 14, by said tractor transmitting corresponding signals to a control device of the compacting vehicle which subsequently automatically starts and performs its work, or a user of the compacting vehicle receives a message via a user interface of the compacting vehicle, or the user may identify that compacting is now required on the basis of the transport vehicle 12 driving off.

Step 110 is followed by step 112 in which it is checked whether the process of introducing the harvested material into the silo 20 is completed. This is the case when the entire field has been harvested or the silo 20 is sufficiently filled. The control device 30 may identify the completion of the storage, therefore, using the accumulated layer thicknesses 28 and/or using signals from the forage harvester 10 regarding the completion of the harvesting process or using an estimation of the quantity of harvested material on the field by means of a satellite map. If the process is completed, the end of the ensilaging process follows in step 114.

It should also be mentioned that until now the exemplary embodiment provides only a single transport vehicle 12. In reality, a plurality of transport vehicles 12 take part in the ensilaging process, the control units 30 thereof communicating with one another via communication interfaces 36. A control unit 30 of a first transport vehicle 12 may undertake a master role in which it performs steps 102 and 104 and informs the other transport vehicles 12 about the results of these steps, so that said transport vehicles may refer to this data when steps 106, 108 and 112 are performed separately.

One transport vehicle 12 does not necessarily have to deposit a complete harvested material layer 28 on the silo 20 but a single harvested material layer 28 may be generated by plurality of transport vehicles 12. The transport vehicles 12 may respectively deposit a portion of the thickness of the harvested material layer 28 or deposit their harvested material layers 28 laterally adjacent to one another on the silo 20. To this end, the control devices 30 of the transport vehicles 12 inform one another about the deposited layer thicknesses and positions and take these into account in the separate operations.

Finally, some of the tasks of the control units 30 could be carried out by a central computer (not shown), namely in particular performing steps 102 and 104 with the transmission to the control units 30 of the transport vehicle 12 or the transport vehicles 12 and mutual information about the deposited layer thicknesses and positions.

As a result, a desired thickness of the harvested material layer 28 is achieved by the described method, which makes a separate distribution of the harvested material on the silo 20 unnecessary or at least permits this in a shorter time than hitherto. The process may thus be carried out more rapidly and with less expenditure of energy than hitherto.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of storing harvested crop material in a silo, the method comprising:
   loading the crop material into a container of a transport vehicle in a field, wherein the container includes a discharge system controlled via an electronic control device and operable to unload the crop material from the container;
   transporting the crop material from the field to the silo with the transport vehicle; and
   unloading the crop material from the container of the transport vehicle directly into the silo with the discharge system, wherein the electronic control device automatically controls at least one of the transport vehicle and the discharge system while unloading the crop material to form a harvested material layer in the silo having a predetermined layer thickness.

2. The method set forth in claim 1, wherein the electronic control device is supplied with information regarding one of the predetermined layer thickness or information regarding properties of the harvested material by which the control device calculates the layer thickness.

3. The method set forth in claim 2, wherein the electronic control device controls at least one of a speed or a path of the transport vehicle over the silo, or at least one parameter of the discharge system, to achieve the predetermined layer thickness of the harvested material layer.

4. The method set forth in claim 3, wherein the electronic control device communicates via a user interface with a user of the transport vehicle, or automatically activates a steering or speed setting of the transport vehicle, or automatically activates an actuator of the discharges system for controlling the discharge system.

5. The method set forth in claim 1, wherein the predetermined layer thickness varies in at least one of a horizontal direction or a vertical direction of the silo.

6. The method set forth in claim 1, wherein the predetermined layer thickness is uniform across the silo.

7. The method set forth in claim 1, wherein the harvested material layer is deposited on the silo by a plurality of transport vehicles communicating with one another.

8. The method set forth in claim 1, further comprising compacting the harvested material layer with a compacting vehicle, whereupon a further harvested material layer is subsequently applied onto the silo.

* * * * *